US010296987B2

(12) United States Patent
Boss et al.

(10) Patent No.: US 10,296,987 B2
(45) Date of Patent: May 21, 2019

(54) POLICY-BASED ENERGY MANAGEMENT

(75) Inventors: Gregory J. Boss, American Fork, UT (US); James R. Doran, New Milford, CT (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 12/208,510

(22) Filed: Sep. 11, 2008

(65) Prior Publication Data

US 2010/0063643 A1    Mar. 11, 2010

(51) Int. Cl.
G06Q 50/06 (2012.01)
G06Q 10/10 (2012.01)

(52) U.S. Cl.
CPC .............. *G06Q 50/06* (2013.01); *G06Q 10/10* (2013.01)

(58) Field of Classification Search
CPC ................................. Y02E 40/76; Y04S 10/54
USPC ......................................................... 705/1.1
See application file for complete search history.

(56) References Cited

U.S. PATENT DOCUMENTS

| | | |
|---|---|---|
| 5,404,136 A | 4/1995 | Marsden |
| 5,572,438 A | 11/1996 | Ehlers et al. |
| 5,706,191 A | 1/1998 | Bassett et al. |
| 5,761,083 A | 6/1998 | Brown, Jr. et al. |
| 5,958,012 A | 9/1999 | Battat et al. |
| 6,178,362 B1 | 1/2001 | Woolard et al. |
| 7,103,452 B2 | 9/2006 | Retsina |
| 2002/0091972 A1 | 7/2002 | Harris et al. |
| 2005/0034023 A1 | 2/2005 | Maturana et al. |
| 2007/0255461 A1* | 11/2007 | Brickfield et al. ............ 700/295 |
| 2008/0252141 A1* | 10/2008 | Horst .............................. 307/35 |

OTHER PUBLICATIONS

"Rolling Brownouts," https://web.archive.org/web/20080702053353/http://www.computerhope.com/jargon/r/rollbrow.htm, Wayback Machine Jul. 2, 2008.*
Ensite, "EnSite Safari Suite," copyright 2008 EnSite Incorporated, www.capterra.com/energy-management-software/spotlight.

(Continued)

*Primary Examiner* — Aryan E Weisenfeld
(74) *Attorney, Agent, or Firm* — Christopher K. McLane; Hunter E. Webb; Keohane & D'Alessandro PLLC

(57) ABSTRACT

In general, the present invention discloses a policy-based decision system to manage energy consumption within a complex system, such as a municipality, business or home. These policies help to control energy usage, either for the purpose of conservation or to contend with a shortage situation. In general, policies may be set based on business requirements, including energy demand, energy supply, safety, Quality of Service (QoS) settings per object or groupings, convenience, risk analysis output or events. Among other things the approach described herein discloses the following: creation and management of policies; selection of optimal throttling plan to achieve energy conservation requirements; running of simulation scenarios based on different policies and/or reduction requirements; conducting of risk analysis for different scenarios; etc.

20 Claims, 4 Drawing Sheets

(56) References Cited

OTHER PUBLICATIONS

Chen et al., A Relable Energy Information System for Promoting Voluntary Energy Conservation Benefits, Jan. 2006, IEEE, pp. 102-107.
U.S. Appl. No. 12/208,422, Office Action dated Oct. 28, 2010, 20 pages.
U.S. Appl. No. 12/208,422, Notice of Allowance dated Mar. 9, 2011, 7 pages.

* cited by examiner

POLICY-BASED ENERGY MANAGEMENT

CROSS-REFERENCE TO RELATED APPLICATION

The present application is related in some aspects to commonly owned and co-pending application entitled "Framework for Managing Consumption of Energy", which was filed on Sep. 11, 2008, and was assigned U.S. patent application Ser. No. 12/208,422, the entire contents of which are herein incorporated by reference.

FIELD OF THE INVENTION

This invention discloses an approach for managing the consumption of energy. Specifically, the present invention provides a solution for policy-based energy management.

BACKGROUND OF THE INVENTION

As energy prices continue to rise, companies and individuals are seeking ways to reduce consumption and manage shortage situations. Currently, methods for managing power shortage situations are limited, as managing power usage of objects in an infrastructure is a nascent industry. A few early solutions include: WebSphere XD, which allows application servers to be tuned down to lower power consumption modes (WebSphere is a trademark of IBM Corp. in the United States and/or other countries); and devices may be connected to home appliances (e.g. air conditioner) that allow the power company to turn off power to the appliance when a shortage occurs. This only enables an on/off situation for selected devices.

Unfortunately, options for managing individual objects of a system are limited, as most products do not provide intelligent options. Centralized management of heterogeneous devices during a power shortage does not exist.

SUMMARY OF THE INVENTION

In general, the present invention discloses a policy-based decision system to manage energy consumption within a complex system, such as a municipality, business or home. These policies help to control energy usage, either for the purpose of conservation or to contend with a shortage situation. In general, policies may be set based on business requirements, including energy demand, energy supply, safety, Quality of Service (QoS) settings per object or groupings, convenience, risk analysis output or events. Among other things the approach described herein discloses the following: creation and management of policies; selection of optimal throttling plan to achieve energy conservation requirements; running of simulation scenarios based on different policies and/or reduction requirements; conducting of risk analysis for different scenarios; etc.

A first aspect of the present invention provides a method for policy-based energy management, comprising: enrolling a hierarchy of entities and devices in an energy management system; associating a set of energy management policies with at least a subset of the entities and devices of the hierarchy; initiating an energy conservation request; and traversing the hierarchy and selecting an optimal energy throttling plan based on the set of policies to satisfy the energy conservation request.

A second aspect of the present invention provides a system for policy-based energy management, comprising: a module for enrolling a hierarchy of entities and devices in an energy management system; a module for associating a set of energy management policies with at least a subset of the entities and devices of the hierarchy; a module for initiating an energy conservation request; and a module for traversing the hierarchy and selecting an optimal energy throttling plan based on the set of policies to satisfy the energy conservation request.

A third aspect of the present invention provides a computer readable medium containing a set of program instructions for policy-based energy management, the computer readable medium comprising program code for causing a computer system to: enroll a hierarchy of entities and devices in an energy management system; associate a set of energy management policies with at least a subset of the entities and devices of the hierarchy; initiate an energy conservation request; and traverse the hierarchy and select an optimal energy throttling plan based on the set of policies to satisfy the energy conservation request.

A fourth aspect of the present invention provides a method for deploying a system for policy-based energy management, comprising: deploying a computer infrastructure being operable to: enroll a hierarchy of entities and devices in an energy management system; associate a set of energy management policies with at least a subset of the entities and devices of the hierarchy; initiate an energy conservation request; and traverse the hierarchy and select an optimal energy throttling plan based on the set of policies to satisfy the energy conservation request.

A fifth aspect of the invention provides at least one data processing system for policy-based energy management, comprising: at least one memory medium having instructions; at least one bus coupled to the memory medium; and at least one processor coupled to the least one bus that when executing the instructions causes the at least one data processing system to: enroll a hierarchy of entities and devices in an energy management system; associate a set of energy management policies with at least a subset of the entities and devices of the hierarchy; initiate an energy conservation request; and traverse the hierarchy and select an optimal energy throttling plan based on the set of policies to satisfy the energy conservation request.

A sixth aspect of the present invention provides a computer-implemented set of business goals and methods for policy-based energy management, comprising: enrolling a hierarchy of entities and devices in an energy management system; associating a set of energy management policies with at least a subset of the entities and devices of the hierarchy; initiating an energy conservation request; and traversing the hierarchy and selecting an optimal energy throttling plan based on the set of policies to satisfy the energy conservation request.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
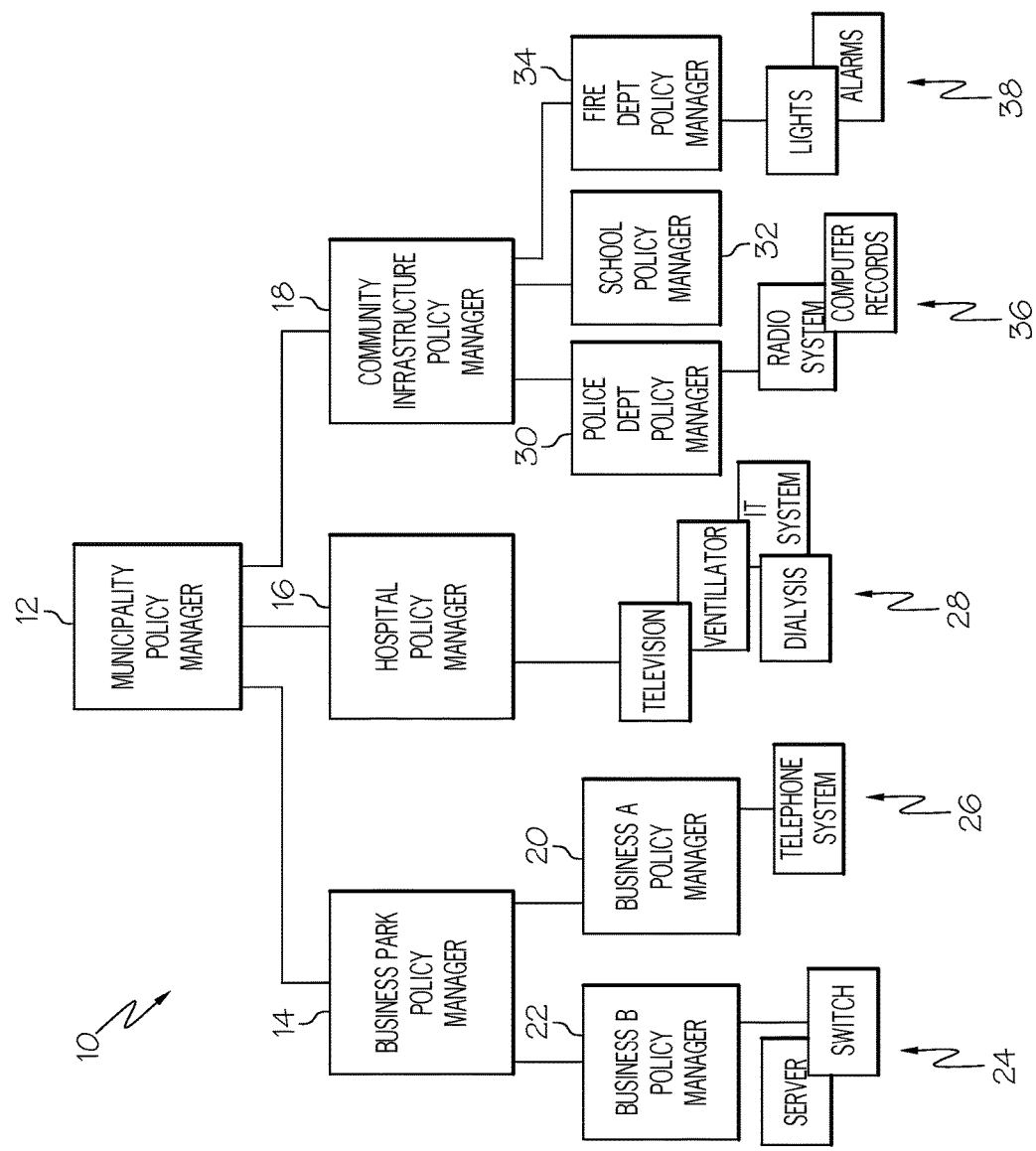
FIG. 1 depicts an illustrative policy management hierarchy according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

For convenience, the Detailed Description of the Invention has the following Sections:

I. General Description
II. Computerized Implementation

I. General Description

As used herein, the following terms have the associated meanings:

"Set"—a quantity of at least one.

"Object"—any device, group of devices, or organization using devices that consume power.

In general, the present invention discloses a policy-based decision system to manage energy consumption within a complex system, such as a municipality, business or home. These policies help to control energy usage, either for the purpose of conservation or to contend with a shortage situation. In general, policies may be set based on business requirements, including energy demand, energy supply, safety, Quality of Service (QoS) settings per object or groupings, convenience, risk analysis output or events. Among other things, the approach described herein discloses the following: creation and management of policies; selection of optimal throttling plan to achieve energy conservation requirements; running of simulation scenarios based on different policies and/or reduction requirements; conducting of risk analysis for different scenarios; etc. This enables business users to set policies for management of energy usage in a shortage situation. A predefined mapping links the business policies with technical rules to throttle energy usage.

In one embodiment, this approach may utilize a framework and communication as described in the above incorporated patent application. Alternatively, it may utilize a different means for overall management of the enterprise and communication among pieces of the system. In a typical embodiment, a Policy Manager may be used to store and manage the policies, determine optimal throttling, run simulations and perform risk analysis.

Referring now to FIG. 1 a policy management hierarchy 10 is shown. FIG. 1 is to demonstrate, among other things, that the present invention could be implemented in conjunction with any hierarchy of devices, regardless of complexity. In addition, policy management hierarchy 10 can be similar in structure to a corresponding framework hierarchy such as that shown in the above-incorporated patent application. In the example shown, power control management systems/power control manager (hereinafter policy manager) are utilized on multiple levels. Municipality policy manager 12 works in conjunction with business park policy manager 14, hospital policy manager 16, and community infrastructure policy manager 18. Further, business park policy manager 14 interacts with business A policy manager 20 and business B policy manager 22, each of which controls power consumption with their own devices 24 and 26. Similarly, hospital policy manager 16 controls power consumption by devices 28. Community infrastructure policy manager 18 is shown interacting with police department policy manager 30, school policy manager 32, and fire department policy manager 34, which among themselves, manage devices 36 and 38. As can be seen, a policy manager under the present invention can not only interact with devices, but also with other policy managers.

Under the present invention, a hierarchy of entities and/or devices (collectively referred to as objects) will be enrolled in the energy management system. A set of policies will then be associated with at least a subset of the set of objects. This association can be on a one to one basis or some other basis (e.g., multiple objects to one policy). In general, the energy management policies dictate how power will be apportioned and/or controlled/throttled under certain situations. For example, an energy management policy for a municipality can dictate that in shortage situations X % of available energy will be allocated to the business park, Y % to the hospital, and Z % to the community infrastructure. From there, the hierarchy will be traversed (e.g., downward) with the policies at each node or level being applied. Along these lines, the hierarchy will comprise a set of entities and/or devices (collectively referred to as objects). When a shortage situation is observed, an energy conservation request is initiated and the hierarchy is traversed. An optimal energy throttling plan will be selected based on the set of policies to satisfy the energy conservation request.

Specifically, once all entities, devices and policies are entered into the Policy Manager system, the system may select an optimal throttling plan for a given reduction requirement. This is done by traversing the tree of hierarchically connected entities and devices. First it dictates energy reduction at the top level. Then, that is broken out to dictate an energy reduction in the branches at a secondary level, based on their policies. They, in turn, dictate an energy reduction to the layer below them. This continues until the end devices at the bottom of the tree have all received their energy throttling instructions based on the policies.

Under the present invention, in addition to the above described steps, the following functionality is also provided:

Creation and Management of Policies

Policies may be set based on business or technical requirements, including:

Demand
Supply
Safety
Quality of Service (QoS) settings per object, object grouping or entity
Convenience
Risk Analysis
Event based Policies may be set for entities, objects, devices, groups of devices, zones, etc. . . .

Quality of Service (QoS)

QoS settings may be designated per object or grouping of objects. When shortages occur, items with a higher QoS will be throttled less. An energy negotiation option may be made available to entities or objects. Once notified of the shortage, the system may allow entities to automatically, or with human intervention, negotiate in real-time for a higher QoS rating, preserving their right to use energy. This would often result in higher fees to the entity and change its policy setting in the system.

Event-Based Policies

Policies may be created on an event basis (aka scenario basis). This enables managers of the system to run different scenarios, showing how energy would be managed for different situations.

If the event is flood, use this set of policies, grouping objects in manner "X"

If the event causing shortage is hot weather, use this other set of policies, grouping objects in manner "Y".

If the event occurs in the football stadium during the Super Bowl, set higher QoS to stadium resources, as energy loss during crowd gathering is a public safety concern. If an outage occurs when stadium is empty, a low QoS could be assigned. The availability of an energy backup system would likely also be included in a policy. If an entity is known to have sufficient backup to keep running, they may be throttled to give energy to others without a backup.

Object Groupings or Zones

Components may be grouped by logical characteristics, physical similarities, owner, use, or any other attribute. Zones may be established based on geographical or logical locations (e.g. a data center, hospital, or emergency rooms within hospitals).

Steps:
1. Objects are entered into system
2. Policy for amount of reduction required is communicated to entities
3. Entities communicate reduction requirements to their sub-entities
4. Sub-entities communicate throttle required to associated devices Selection of Optimal Throttling Plan As mentioned above, once objects and policies are entered into the Policy Manager system, the system may select an optimal throttling plan for a given reduction requirement. This is done by traversing the tree of hierarchically connected entities and devices. First it dictates energy reduction at the top level. Then, that is broken out to dictate an energy reduction in the branches at a secondary level, based on their policies. They, in turn, dictate an energy reduction to the layer below them. This continues until the end devices at the bottom of the tree have all received their energy throttling instructions based on the policies.

Running Simulation Scenarios

Given that the management system may be very complex, with thousands of individual objects, many different scenarios may be possible based on numerous policy options and reduction requirements. This would be very time consuming (or almost impossible for a large enterprise) to conduct manually.

Users may simulate different policy scenarios to determine the risks of different energy shortage situations. Running the simulation would show the results of each selected policy scenario. Any known or future simulation methods may be used, including Monte Carlo analysis.

Conduct Risk Analysis

Risk analysis involves determining the likelihood and consequence of each possible situation. Running a risk analysis of a given set of policies in a large enterprise may be a complex activity. Entities or objects may set risk-based attributes, including the consequence of energy being lowered or shut off. Any known methods for conducting risk analysis may be used.

Municipality Scenario
1. A city is experiencing brown-out conditions due to energy shortage
2. A hospital is equipped with a comprehensive energy management system disclosed in this invention (e.g., policy manager).
3. Rate of total energy reduction required is communicated to policy manager. (e.g., 20% reduction for 2 hours)
4. Policy manager determines optimal amount of reduction required for each device in system, based on requirements provided and policies set Nonessential devices (coffee pots, refrigerators, televisions) energy is cut completely Life-saving devices (oxygen systems) energy is not cut or throttled at all IT systems (billing, medical records, imaging, etc.) energy is throttled 25%.

All objects in zones designated as operating rooms are not throttled
5. Policy manager sends signal either directly to devices or to third party energy regulating device
6. Policy manager monitors system to determine if calculated throttle plan is meeting its objective throttle amount
7. If policy manager detects that available energy to the hospital is dropping, it recalculates throttling to adjust to new supply levels.

Data Center Scenario
1. Policy manager sets policy to reduce energy in data center by 15% overnight on weekends.
2. Policy manager has pre-populated its databases with all devices and their dependencies.
3. Policy manager runs analysis to determine optimal throttling per device to achieve specified reduction.
4. Policy manager signals sub-policy manager servers, devices directly or third party energy regulator.

Figure 2:
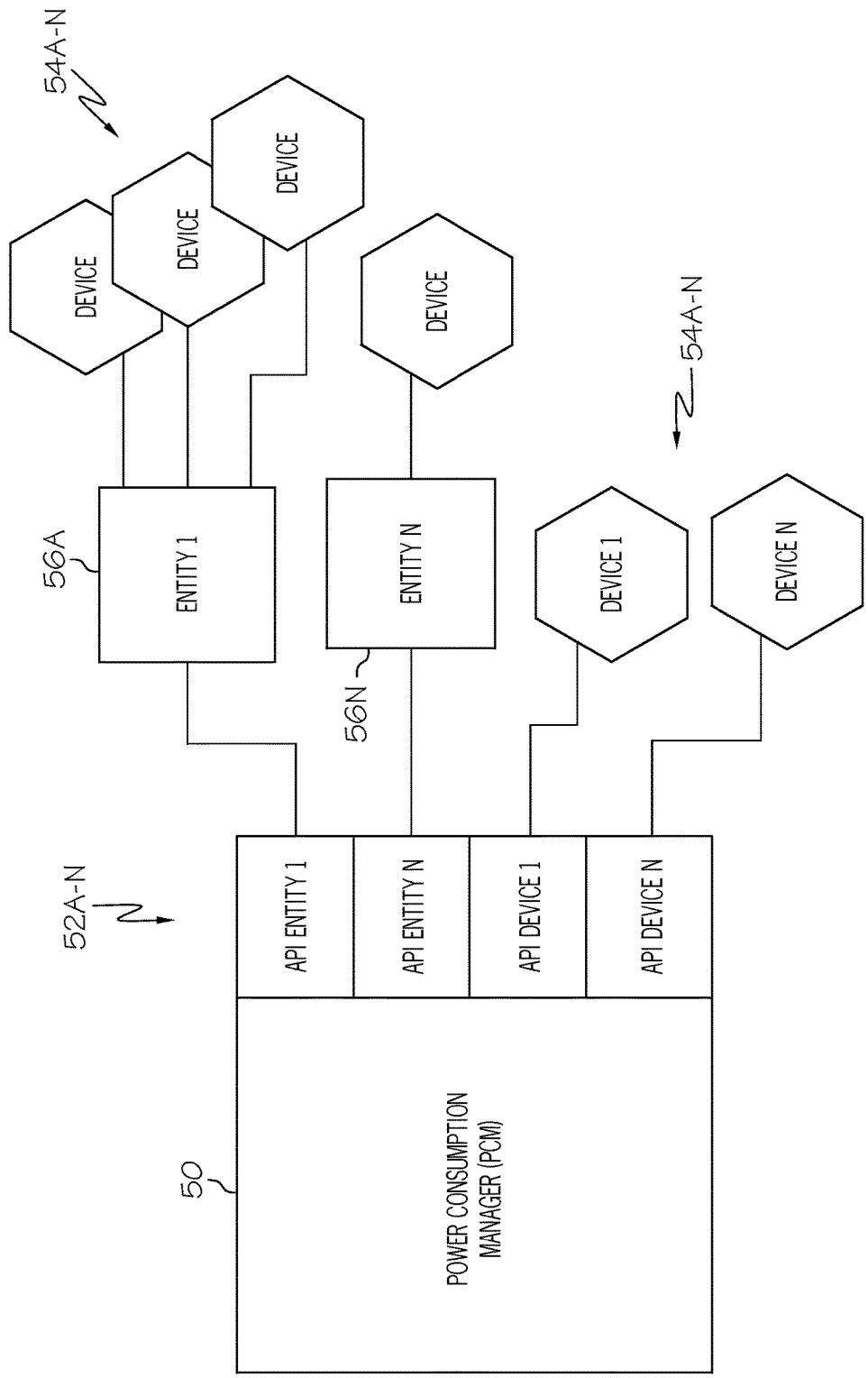
FIG. 2 depicts an interface to heterogeneous objects according to the present invention.

As indicated above, the present invention will typically be used in conjunction with a policy manager. Referring now to FIG. 2, the functions of a policy manager 50 will be described. As used in FIG. 2, entities 56A-N represent any business object that has one or more object/device. Sample entities may include a hospital, business or municipality. As such, devices 54A-N are each a piece of the overall system who's power may be throttled. This may be a particular software application, piece of IT hardware (server, storage, networking switch, etc.), other hardware (life support equipment, refrigerator, etc.).

Under the present invention, each device, entity, etc. is enrolled into the system. This may occur manually, through auto-discovery by policy manager 50 or by device 54A-N self-enrollment to policy manager 50. Once enrolled, policy manager 50 maintains a database of devices and their attributes. Sample device attributes are as follows:

Device ID=0487
Device name="refrigerator01"
Average power consumed=50
Throttle capabilities="on/off"
Quiesce first="no"

Regardless, this functionality may be implemented with a single power management server, groups of servers, or a hierarchy of servers. A hierarchy is the preferred embodiment for an enterprise system, as that allows for delegation to sub-entities.

As further depicted, policy manager 50 has a set of application programming interfaces (APIs) 52A-N which allow communication to occur between policy manager 50 and devices 54A-N and/or entities 56A-N. Although not shown in FIG. 2, an API would also allow policy manager 50 to interface with another policy manager. Heterogeneous devices from different vendors may have very different interfaces. The technology described herein will interface to different devices, or to any known or future power management standard. For example, the interface to communicate with IBM WebSphere XD software (WebSphere is a trademark of IBM Corp in the United States and/or other countries) may differ greatly from the interface for a medical device to manage power to an anesthesia machine, which would differ from the interface to a refrigerator.

Under the present invention, when power conservation is needed (e.g., power shortages are occurring, energy pricing is spiking, etc.), devices 54A-N may be throttled in any of following ways: On/Off, Stepwise (High, Med, Low settings), and Continuous. The awareness of the device throttling capabilities will be stored in either the device software or a policy manager server. Commands sent to the device to instruct it to throttle will take into account these capabilities.

It is recognized that many devices may have proprietary interfaces for signaling to throttle power. Although this framework provides for an API to interface to nonstandard devices, it is preferred that devices standardize their power management interfaces in the future. This disclosure allows for the creation of standard methods and interfaces for communication to objects of an intelligent energy management system. Heterogeneous hardware and software objects may seamlessly plug into the framework for managing energy usage.

Figure 3:
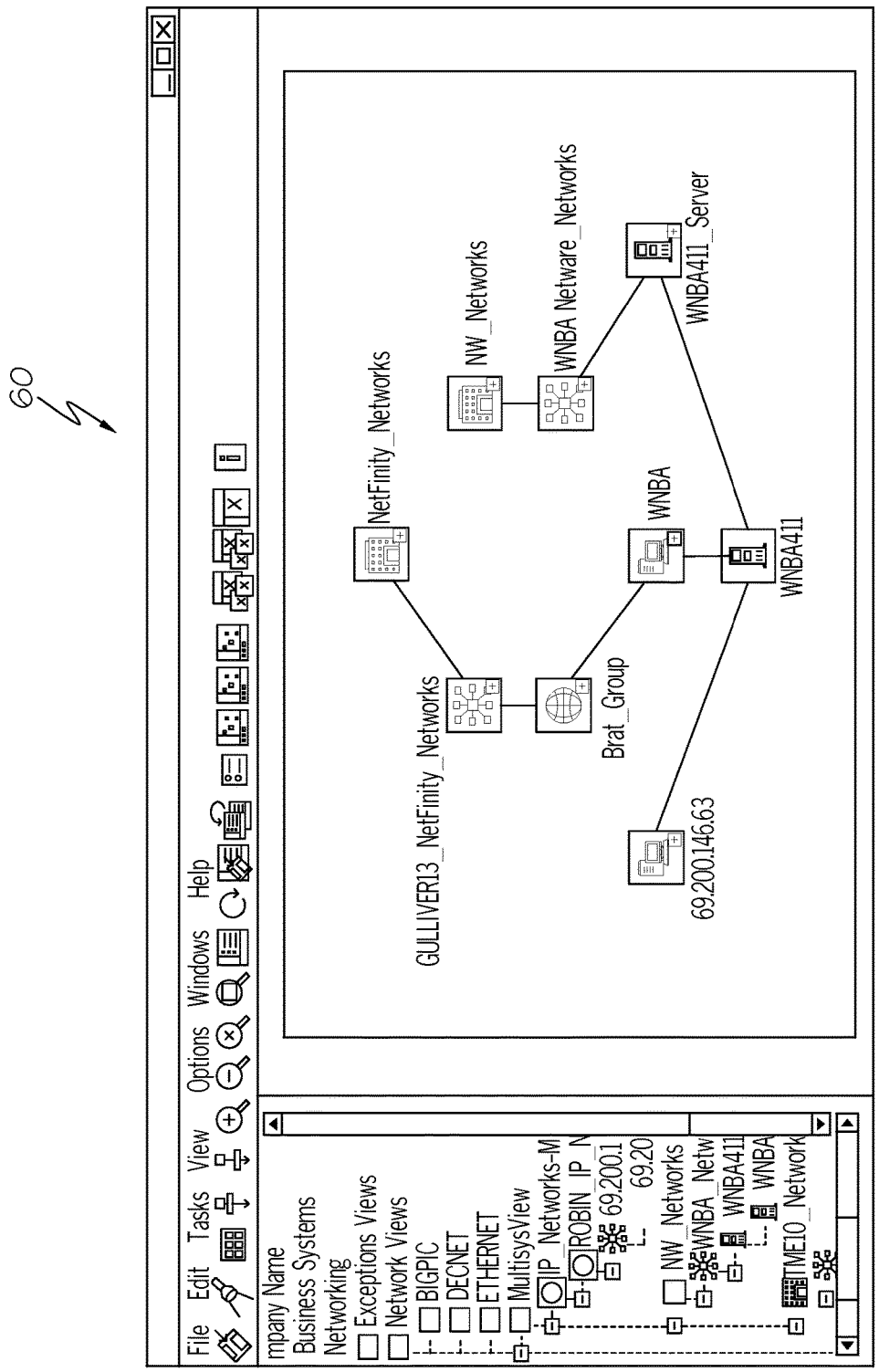
FIG. 3 depicts an illustrative graphical user interface (GUI) according the present invention.

When conservation is required, policy manager 50 notifies devices 54A-N. If time allows, this may allow them time to move to a quiescent state before throttling begins. Devices with the intelligence to lower their own usage may use this notification to throttle themselves. Other devices may require the management system to signal a separate power management device to lower the power to them. Along these lines, the power reduction trigger may be automated by policy manager 50 or initiated manually through policy manager 50. The system may manage power based on predictable cycles (e.g. lower power overnight) or based on real-time request. Once power reduction is needed, policy manager 50 will send instructions to one or more devices 54A-N dictating just how power should be consumed. Thereafter, policy manager 50 will monitor such devices 54A-N to ensure compliance with the instructions. For optimal performance, the ability to communicate in real-time with entities 56A-N and devices 54A-N enables the system to monitor their power consumption and compliance with conservation requests. In performing its functions, policy manager 50 is typically controlled by one or more policies that state (among other things) when, how and for how long power consumption should occur. To make control and programming of policy manager 50 easier, the present invention can provide a graphical user interface (GUI) 60 similar to that shown in FIG. 3. Such a GUI 60 can provide all functionality discussed herein including compiling and changing hierarchies of devices and/or entities, managing policies, managing power consumption triggers, issuing instructions to devices, monitoring devices, etc.

II. Computerized Implementation

Figure 4:
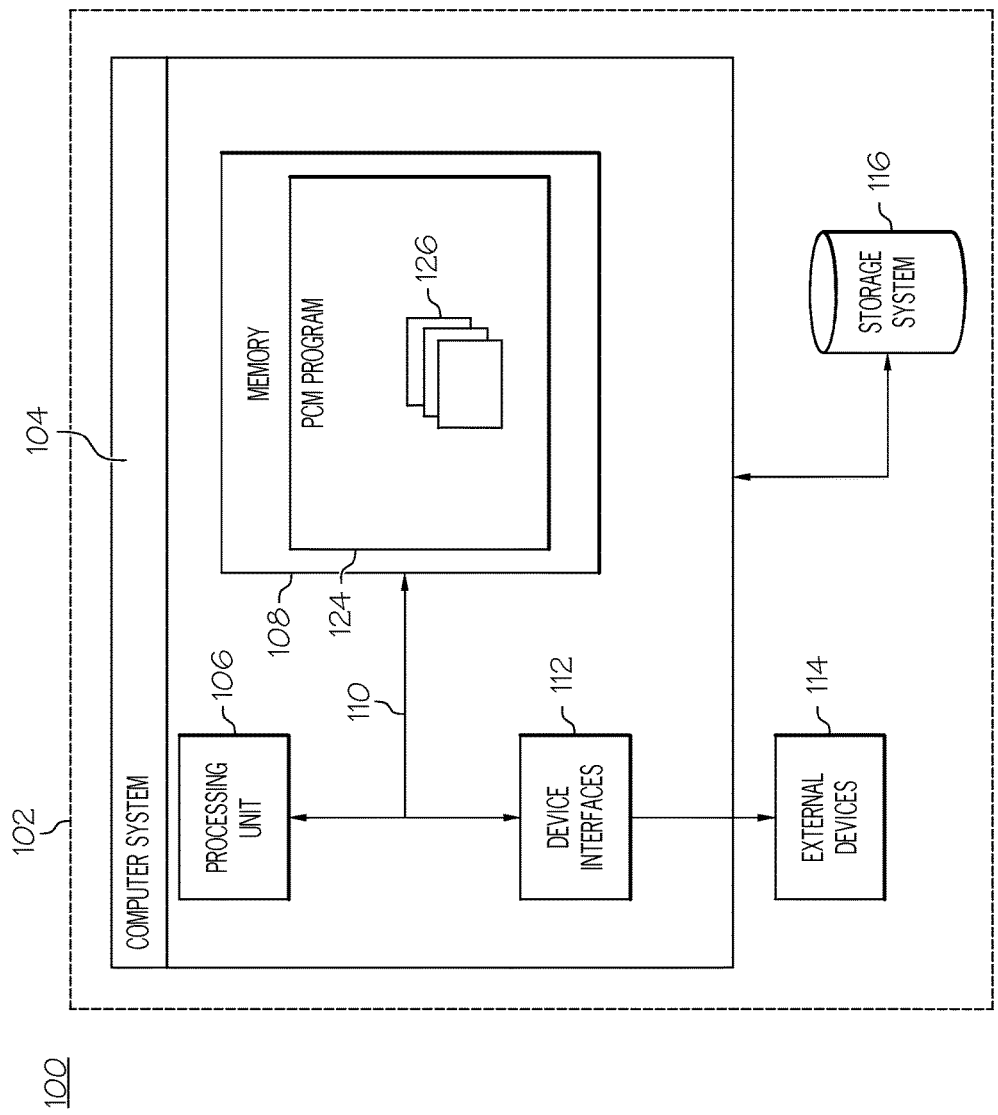
FIG. 4 depicts a more specific computerized implementation according to the present invention.

Referring now to FIG. 4, a computerized implementation 100 of the present invention is shown. As depicted, implementation 100 includes computer system/PCM 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

Computer system is intended to represent any type of computer system that may be implemented in deploying/realizing the teachings recited herein. In this particular example, computer system 104 represents an illustrative system that could represent a Policy Manager. It should be understood that any other computers implemented under the present invention will have similar components, but may perform different functions/have different software. As shown, computer system 104 includes a processing unit 106, a memory 108, a bus 110, and device interfaces 112. Further, computer system 104 is shown communicating with one or more external devices 114 that communicate with bus via device interfaces. In general, processing unit 106 executes computer program code, such PCM program 124, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices. Although not shown, computer system 104 could contain multiple processing units.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 2 can be included in computer system 104.

Storage system 116 can be any type of system capable of providing storage for information under the present invention. To this extent, storage system 116 could include one or more storage devices such as magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is PCM program 124, which has a set of modules 126. Set of modules 126 generally provide the functions of the present invention as described herein. Specifically (among other things), set of modules 26 is configured to: enroll a hierarchy of entities and devices in an energy management system; associate a set of energy management policies with a least a subset of the entities and devices of the hierarchy; initiate an energy conservation request; traverse the hierarchy and select an optimal energy throttling plan based on the set of policies to satisfy the energy conservation request; etc.

While shown and described herein as an approach for policy-based energy management, it is understood that the invention further provides various alternative embodiments. For example, in one embodiment, the invention provides a computer-readable/useable medium that includes computer program code to enable a computer infrastructure to policy-based energy management. To this extent, the computer-readable/useable medium contains program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.).

In another embodiment, the invention provides a business method that performs the process of the invention on a subscription, advertising, and/or fee basis. That is, a service provider, such as a Solution Integrator, could offer to provide management of energy consumption. In this case, the service provider can create, maintain, support, etc., a computer infrastructure, such as computer infrastructure 102 (FIG. 4) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method to enable a computer infrastructure to policy-based energy management. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for policy-based energy management, the method employing at least one computing device programmed to perform the following steps:

automatically discovering, by at least one computer device, each of a plurality of entities and devices in an energy system;

enrolling, by the at least one computer device, the discovered entities and devices hierarchically in a hierarchy in an energy management system;

forming, by the at least one computer device, a hierarchical tree of the hierarchy that reflects connections of the each of the plurality of entities within the energy system;

associating, by the at least one computer device, a set of energy management policies with at least a subset of the entities and devices of the hierarchy in the hierarchical tree;

initiating an energy conservation request; and traversing, by the at least one computer device, the hierarchy in the hierarchical tree and selecting an optimal energy throttling plan based on the set of policies to satisfy the energy conservation request by first dictating an energy reduction policy that defines an overall energy reduction percentage at a top layer, wherein the top layer determines energy reduction in a set of entities in a layer immediately below the top layer by allocating a non-zero percentage of available energy that is based on the overall energy reduction percentage to a first entity and a different non-zero percentage of available energy that is based on the overall energy reduction percentage to a second entity, each of the set of entities corresponding to a branch of a set of branches in the hierarchy, and then continuing down a series of layers of each of the set of branches of the hierarchy by allocating a percentage of available energy that is based on an energy reduction percentage of a parent entity until end devices at a bottom of the hierarchy have all received energy throttling instructions, and wherein each entity or device at each of the series of layers of each of the set of branches is delegated by a parent entity or device to dictate energy reduction to the entity or device at a next layer below in the series of layers, wherein an energy management policy for a first device of a particular type that is associated hierarchically with one entity is different from an energy management policy of a second device of the particular type that is associated hierarchically with a different entity.

2. The method of claim 1, further comprising running a set of simulation scenarios based on the optimal energy throttling plan.

3. The method of claim 1, further comprising conducting a risk analysis for the optimal energy throttling plan.

4. The method of claim 1, further comprising creating the set of energy management policies based on a desired quality of service.

5. The method of claim 1, further comprising creating the set of energy management policies based on a set of events.

6. The method of claim 1, the set of energy management policies dictating how energy should be apportioned among the entities and the devices within the hierarchy.

7. A computer system operating with a plurality of modules to provide policy-based energy management, the computer system comprising:
  a computer processing unit device;
  a memory device operably associated with the computer processing unit device;
  PCM program storable in the memory device and executable by the computer processing unit device, the PCM program comprising instructions that cause the computer system to:
    automatically discover each of a plurality of entities and devices in an energy system;
    enroll the discovered entities and devices hierarchically in a hierarchy in an energy management system;
    form a hierarchical tree of the hierarchy that reflects connections of the each of the plurality of entities within the energy system;
    associate a set of energy management policies with at least a subset of the entities and devices of the hierarchy in the hierarchical tree;
    initiate an energy conservation request; and
    traverse the hierarchy in the hierarchical tree and select an optimal energy throttling plan based on the set of policies to satisfy the energy conservation request by first dictating an energy reduction policy that defines an overall energy reduction percentage at a top layer, wherein the top layer determines energy reduction in a set of entities in a layer immediately below the top layer by allocating a non-zero percentage of available energy that is based on the overall energy reduction percentage to a first entity and a different non-zero percentage of available energy that is based on the overall energy reduction percentage to a second entity, each of the set of entities corresponding to a branch of a set of branches in the hierarchy, and then continuing down a series of layers of each of the set of branches of the hierarchy by allocating a percentage of available energy that is based on an energy reduction percentage of a parent entity until end devices at a bottom of the hierarchy have all received energy throttling instructions, and wherein each entity or device at each of the series of layers of each of the set of branches is delegated by a parent entity or device to dictate energy reduction to the entity or device at a next layer below in the series of layers, wherein an energy management policy for a first device of a particular type that is associated hierarchically with one entity is different from an energy management policy of a second device of the particular type that is associated hierarchically with a different entity.

8. The computer system of claim 7, the PCM program further comprising instructions that cause the computer system to run a set of simulation scenarios based on the optimal energy throttling plan.

9. The computer system of claim 7, the PCM program further comprising instructions that cause the computer system to conduct a risk analysis for the optimal energy throttling plan.

10. The computer system of claim 7, the PCM program further comprising instructions that cause the computer system to create the set of energy management policies based on a desired quality of service.

11. The computer system of claim 7, the PCM program further comprising instructions that cause the computer system to create the set of energy management policies based on a set of events.

12. The computer system of claim 7, the set of energy management policies dictating how energy should be apportioned among the entities and the devices within the hierarchy.

13. A non-transitory computer readable medium containing a program product for policy-based energy management, the computer readable medium comprising a set of program instructions for causing a computer system to:
  automatically discover each of a plurality of entities and devices in an energy system;
  form a hierarchical tree of the hierarchy that reflects connections of the each of the plurality of entities within the energy system;
  enroll the discovered entities and devices hierarchically in a hierarchy in an energy management system;
  associate a set of energy management policies with at least a subset of the entities and devices of the hierarchy in the hierarchical tree;
  initiate an energy conservation request; and
  traverse the hierarchy in the hierarchical tree and select an optimal energy throttling plan based on the set of policies to satisfy the energy conservation request by first dictating an energy reduction policy that defines an overall energy reduction percentage at a top layer, wherein the top layer determines energy reduction in a set of entities in a layer immediately below the top layer by allocating a non-zero percentage of available energy that is based on the overall energy reduction percentage to a first entity and a different non-zero percentage of available energy that is based on the overall energy reduction percentage to a second entity, each of the set of entities corresponding to a branch of a set of branches in the hierarchy, and then continuing down a series of layers of each of the set of branches of the hierarchy by allocating a percentage of available energy that is based on an energy reduction percentage of a parent entity until end devices at a bottom of the hierarchy have all received energy throttling instructions, and wherein each entity or device at each of the series of layers of each of the set of branches is delegated by a parent entity or device to dictate energy reduction to the entity or device at a next layer below in the series of layers, wherein an energy management policy for a first device of a particular type that is associated hierarchically with one entity is different from an energy management policy of a second device of the particular type that is associated hierarchically with a different entity.

14. The non-transitory computer readable medium containing the program product of claim 13, the computer readable medium further comprising a set of program instructions for causing the computer system to run a set of simulation scenarios based on the optimal energy throttling plan.

15. The non-transitory computer readable medium containing the program product of claim 13, the computer readable medium further comprising a set of program instructions for causing the computer system to conduct a risk analysis for the optimal energy throttling plan.

16. The non-transitory computer readable medium containing the program product of claim 13, the computer readable medium further comprising a set of program instructions for causing the computer system to create the set of energy management policies based on a desired quality of service.

17. The non-transitory computer readable medium containing the program product of claim 13, the computer readable medium further comprising a set of program instructions for causing the computer system to create the set of energy management policies based on a set of events.

18. The non-transitory computer readable medium containing the program product of claim 13, the set of energy management policies dictating how energy should be apportioned among the entities and the devices within the hierarchy.

19. A method for deploying a system for policy-based energy management, comprising:

deploying a computer infrastructure being programmable to perform the following steps:
   automatically discovering each of a plurality of entities and devices in an energy system;
   enrolling the discovered entities and devices hierarchically in a hierarchy in an energy management system;
   forming a hierarchical tree of the hierarchy that reflects connections of the each of the plurality of entities within the energy system;
   associating a set of energy management policies with at least a subset of the entities and devices of the hierarchy in the hierarchical tree;
   initiating an energy conservation request; and
   traversing the hierarchy in the hierarchical tree and selecting an optimal energy throttling plan based on the set of policies to satisfy the energy conservation request by first dictating an energy reduction policy that defines an overall energy reduction percentage at a top layer, wherein the top layer determines energy reduction in a set of entities in a layer immediately below the top layer by allocating a non-zero percentage of available energy that is based on the overall energy reduction percentage to a first entity and a different non-zero percentage of available energy that is based on the overall energy reduction percentage to a second entity, each of the set of entities corresponding to a branch of a set of branches in the hierarchy, and then continuing down a series of layers of each of the set of branches of the hierarchy by allocating a percentage of available energy that is based on an energy reduction percentage of a parent entity until end devices at a bottom of the hierarchy have all received energy throttling instructions, and wherein each entity or device at each of the series of layers of each of the set of branches is delegated by a parent entity or device to dictate energy reduction to the entity or device at a next layer below in the series of layers, wherein an energy management policy for a first device of a particular type that is associated hierarchically with one entity is different from an energy management policy of a second device of the particular type that is associated hierarchically with a different entity.

20. The method of claim 19, the computer infrastructure further programmable to perform the step of running a set of simulation scenarios based on the optimal energy throttling plan.

* * * * *